(12) United States Patent
Pinkos et al.

(10) Patent No.: US 12,200,158 B2
(45) Date of Patent: Jan. 14, 2025

(54) PORTABLE RADIO MOUNTING APPARATUS

(71) Applicant: Vorbeck Materials Corp., Jessup, MD (US)

(72) Inventors: Jennifer Pinkos, Hanover, MD (US); James Allen Turney, Silver Spring, MD (US); Jaclyn Scott, Jessup, MD (US); Allie Treacy, Jessup, MD (US)

(73) Assignee: Vorbeck Materials Corp., Jessup, MD (US)

( * ) Notice: Subject to any disclaimer, the term of this patent is extended or adjusted under 35 U.S.C. 154(b) by 387 days.

(21) Appl. No.: 17/749,109

(22) Filed: May 19, 2022

(65) Prior Publication Data

US 2022/0345561 A1     Oct. 27, 2022

Related U.S. Application Data

(63) Continuation of application No. 16/925,581, filed on Jul. 10, 2020, now Pat. No. 11,265,410, and a (Continued)

(51) Int. Cl.
*H04M 1/05*        (2006.01)
*A41D 1/00*        (2018.01)
(Continued)

(52) U.S. Cl.
CPC .............. *H04M 1/05* (2013.01); *A41D 1/002* (2013.01); *A41D 31/08* (2019.02); *H01Q 1/273* (2013.01); *H01Q 1/368* (2013.01); *H04B 1/385* (2013.01); *H04B 2001/3855* (2013.01); *H04W 84/04* (2013.01); *H04W 84/18* (2013.01)

(58) Field of Classification Search
CPC ........................................................ H04M 1/05
See application file for complete search history.

(56) References Cited

U.S. PATENT DOCUMENTS 5,586,168 A * 12/1996 Bucalo ................. H04B 1/3888
                                                                             379/451
6,760,570 B1 * 7/2004 Higdon, Jr. .......... H04B 1/3888
                                                                             455/575.8
(Continued)

*Primary Examiner* — Hsinchun Liao
(74) *Attorney, Agent, or Firm* — Woods Oviatt Gilman LLP; Trent V. Bolar, Esq.

(57) ABSTRACT

Embodiments of the instant disclosure relate to portable radio mounting apparatus (PRMA). The PRMA includes a main body, landing pad, antenna element(s), RF connector conductively coupled to the antenna element, retaining element and has "open" and "closed" states. Landing pad laterally extends from the main body and includes the antenna element(s) and a first end pivotably coupled to main body. RF connector is conductively coupled to the antenna element. In the open state, the landing pad is pivoted away from the main body and thereby exposes the retaining element; the retaining element receives a portable radio and thereby demountably secures the portable radio to the main body; and the RF connector demountably and conductively couples to the portable radio. In the close state, landing pad is pivoted towards the main body and wrapped around the portable; and is demountably coupled to the main body.

18 Claims, 19 Drawing Sheets

Related U.S. Application Data continuation-in-part of application No. 17/382,059, filed on Jul. 21, 2021, which is a continuation of application No. 16/798,712, filed on Feb. 24, 2020, now Pat. No. 11,101,835.

(60) Provisional application No. 63/190,432, filed on May 19, 2021, provisional application No. 62/957,421, filed on Jan. 6, 2020, provisional application No. 62/861,974, filed on Jun. 14, 2019.

(51) Int. Cl.
*A41D 31/08* (2019.01)
*H01Q 1/27* (2006.01)
*H01Q 1/36* (2006.01)
*H04B 1/3827* (2015.01)
*H04W 84/04* (2009.01)
*H04W 84/18* (2009.01)

(56) References Cited

U.S. PATENT DOCUMENTS

| | | | |
|---|---|---|---|
| 6,932,309 B1 * | 8/2005 | Corey | B60R 11/0241 24/130 |
| 7,658,901 B2 | 2/2010 | Prud'Homme et al. | |
| 8,278,757 B2 | 10/2012 | Crain et al. | |
| 10,601,104 B2 | 3/2020 | Manivannan et al. | |

* cited by examiner

PORTABLE RADIO MOUNTING APPARATUS

TECHNICAL FIELD

Cross-reference to Related Applications

This application claims priority to U.S. Provisional Application No. 63/190,432 filed Apr. 19, 2021, which claims priority to U.S. patent application Ser. No. 16/925,581 filed Jul. 10, 2020, which claims priority to U.S. Provisional Application No. 62/957,421 filed Jan. 6, 2020. This application is also a continuation-in-part of U.S. patent application Ser. No. 17/382,059 filed Jul. 21, 2021, which is a continuation of U.S. patent application Ser. No. 16/798,712 filed Feb. 24, 2020, which claims the benefit of U.S. Provisional Application No. 62/861,974 filed Jun. 14, 2019. These applications are hereby incorporated herein by reference.

BACKGROUND

Hand-held (i.e. portable) communications systems, such as walkie-talkies and other portable radio transceiver, are typically used by military personnel, law enforcement officials, first responders, etc. Such systems typically utilize one or more conspicuous antennas, such as whip antennas, which typically consist of a straight flexible metal wire or rod. The bottom end of whip antennas are coupled to the radio receiver, transmitter, or transceiver. Whip antennas are typically designed to be flexible to reduce breaking. In addition, individuals may also carry separate devices for data and video that increase the probability of identifying the user and/or entanglement of the device's antenna. Consumers would benefit from solutions that allow portable communications systems to utilize inconspicuous antennas.

FIGURES

DETAILED DESCRIPTION

Figure 1A:
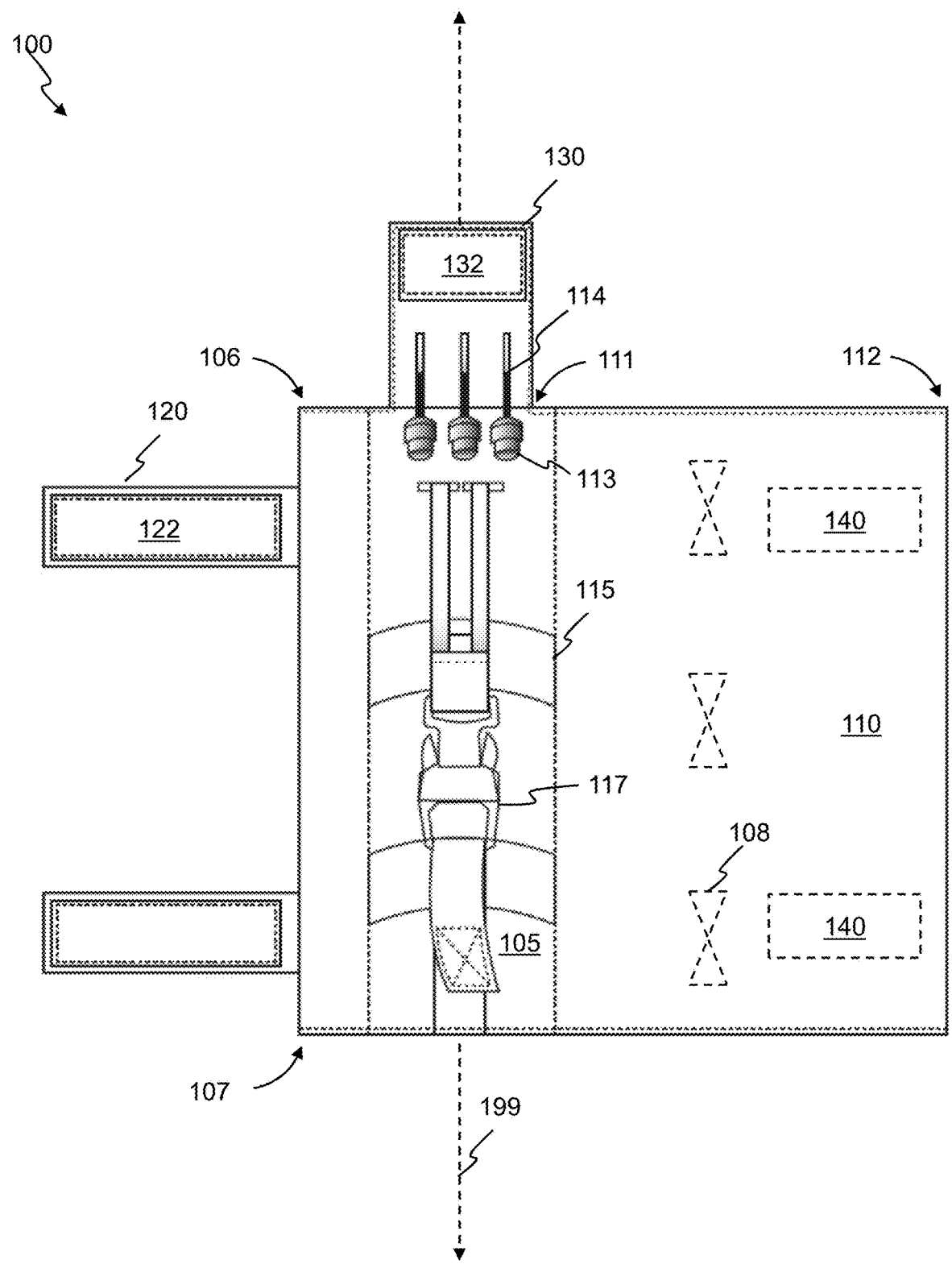
FIG. 1A depicts a front view of a portable radio mounting solution ("PRMS") in an "open" state, according to some embodiments.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

Hand-held (i.e. portable) communications systems, such as walkie-talkies and other portable radio transceiver, are typically used by military personnel, law enforcement officials, first responders, etc. Such systems typically utilize one or more conspicuous antennas, such as whip antennas, which typically consist of a straight flexible metal wire or rod. The bottom end of whip antennas are coupled to the radio receiver, transmitter, or transceiver. Whip antennas are typically designed to be flexible to reduce breaking. In addition, individuals may also carry separate devices for data and video that increase the probability of identifying the user and/or entanglement of the device's antenna. Consumers would benefit from solutions that allow portable communications systems to utilize inconspicuous antennas.

The present disclosure relates generally to mounting apparatus and specifically to portable radio mounting apparatus ("PRMA"). The instant disclosure seeks to provide PRMA that are operationally discrete and have a reduced visual and RF signature. The instant disclosure seeks to provide PRMA with integrated flexible antennas elements and arrays to reduce the probability that the antenna elements become entangled with a foreign object. The instant disclosure also seeks to provide a PRMA that utilizes textiles to provide structural support for the apparatus (e.g., waterproof textiles as well as reinforced textiles that have an enhanced ability to resist tears and rips (i.e. loss of structural integrity).

The instant disclosure further seeks to provide a textile-based portable radio enclosure that includes embedded antenna elements. As used herein, "portable radio" refers to hand-held (i.e. portable) communications systems, such as walkie-talkies and other portable radio transceiver known in the art, that send and/or receive data modulated via one or more communications protocols known in the art. For example, applicable communication protocols can include, but are not limited to, UHF, VHF, Long-Term Evolution ("LTE"), 3G, standards based on GSM/EDGE and/or UMTS/HSPA, Wi-Fi, IEEE 802.11 standards, GPSR, local area networking protocols, wide area networking protocols, Bluetooth, microwave, similar wireless communications protocols, or a combination of two or more thereof.

Figure 2:
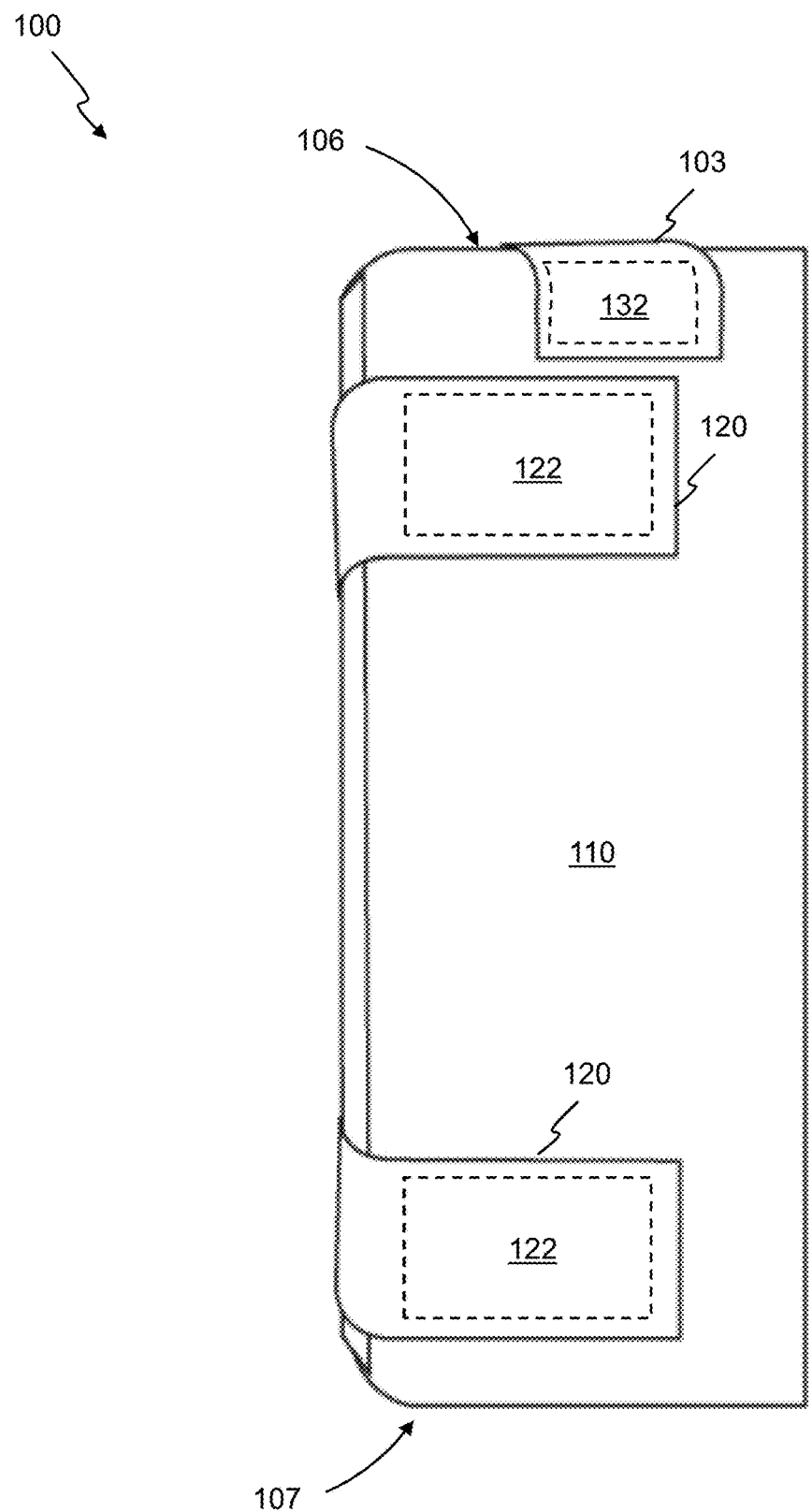
FIG. 2 depicts a front view of the PRMS in the "closed" state of FIG. 1, according to other embodiments.
Figure 3:
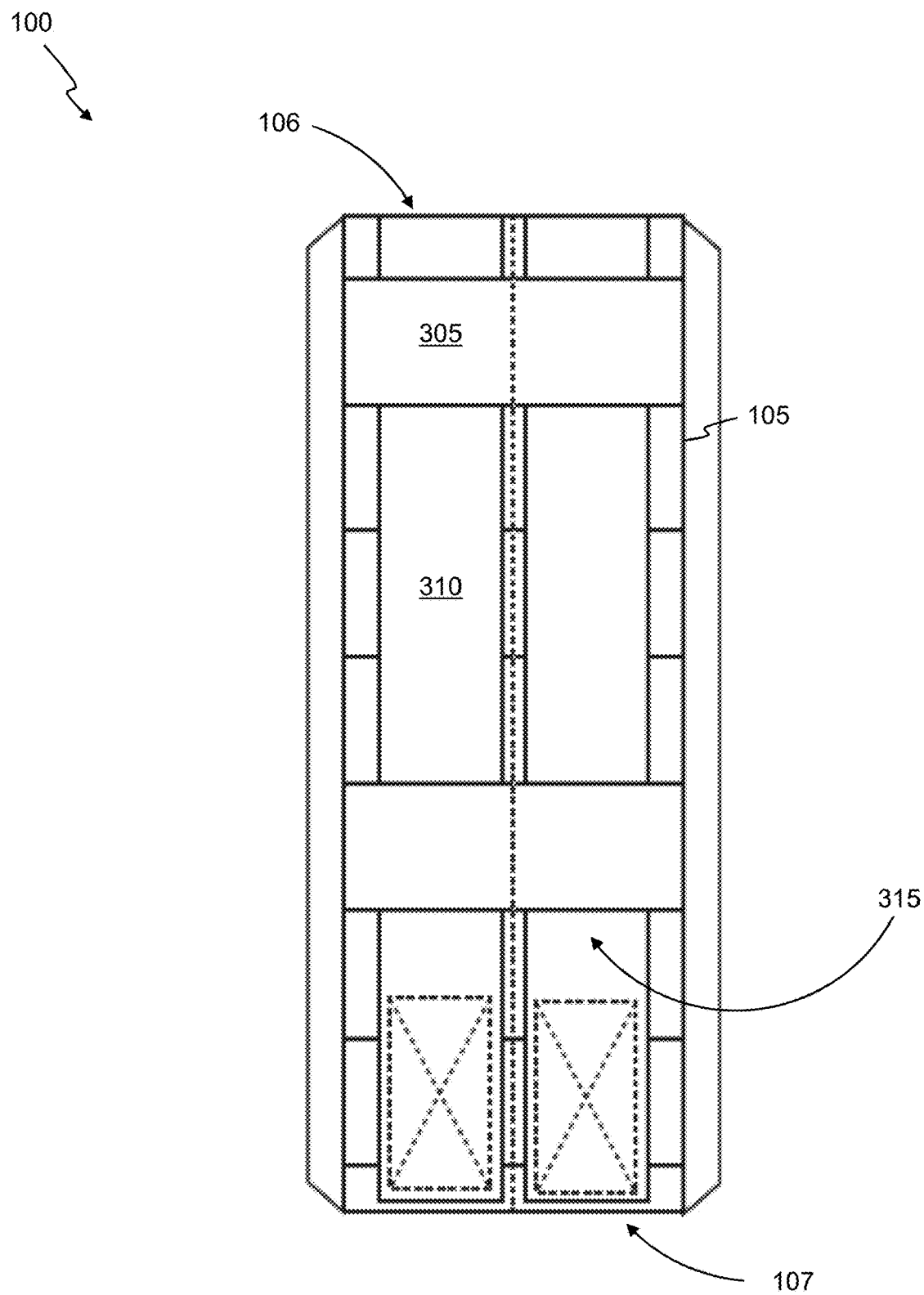
FIG. 3 depicts a rear view of PRMS in the "closed" state of FIG. 1, according to certain embodiments.
Figure 4:
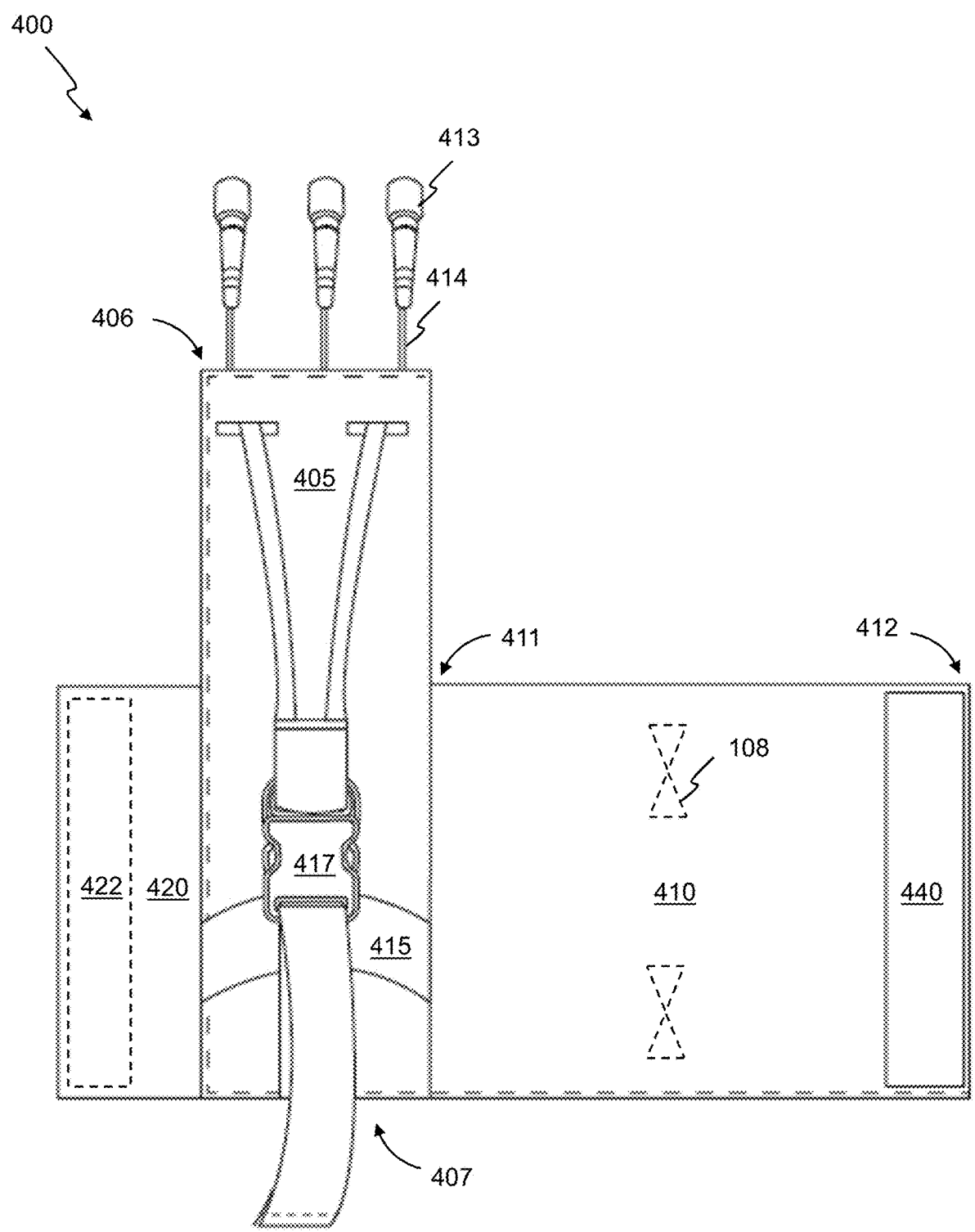
FIG. 4 depicts a front view of a portable radio mounting solution ("PRMS") in an "open" state, according to yet still other embodiments.
Figure 5:
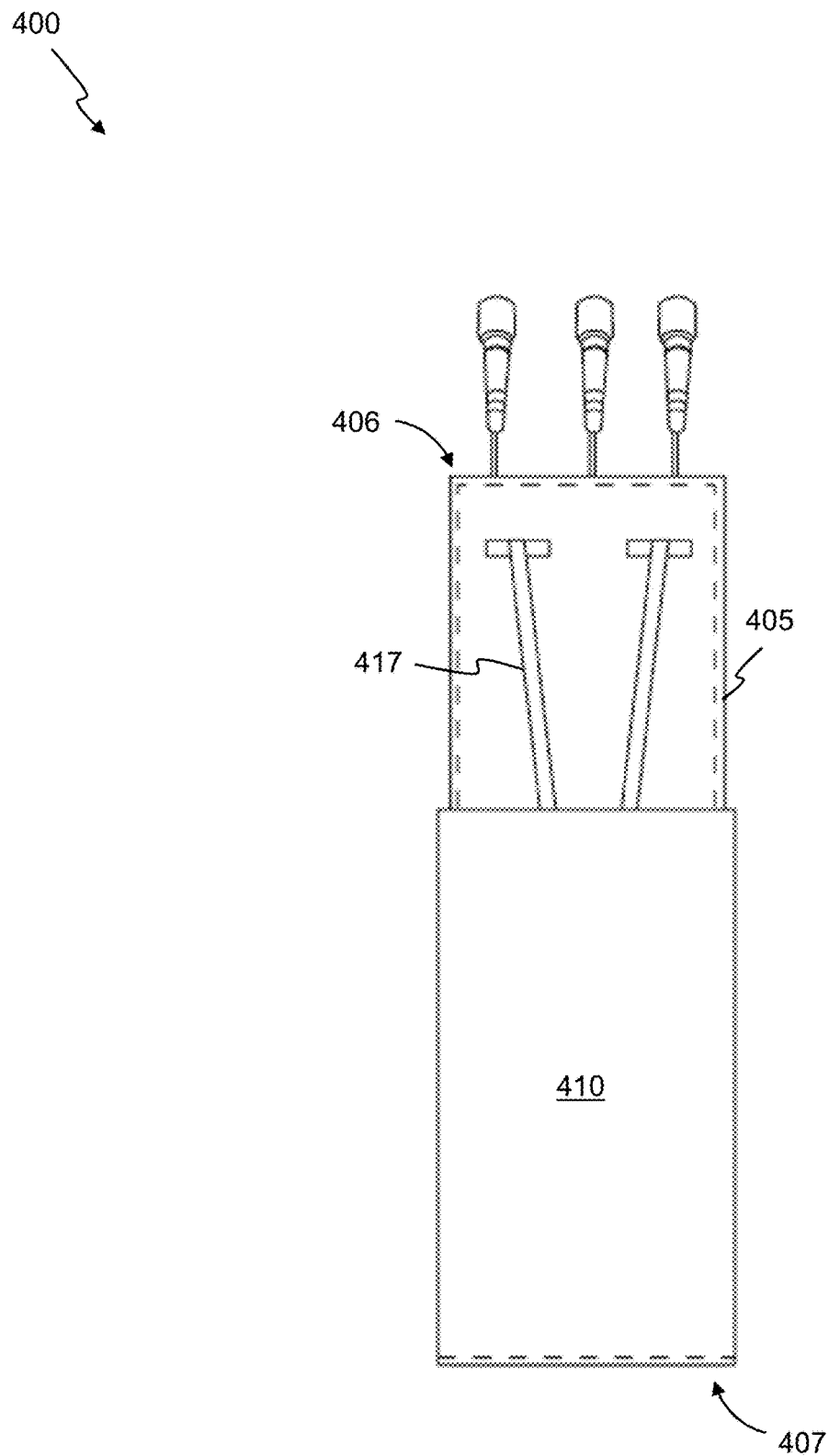
FIG. 5 depicts a front view of the PRMS of FIG. 4 in a "closed" state, according to some embodiments.
Figure 6:
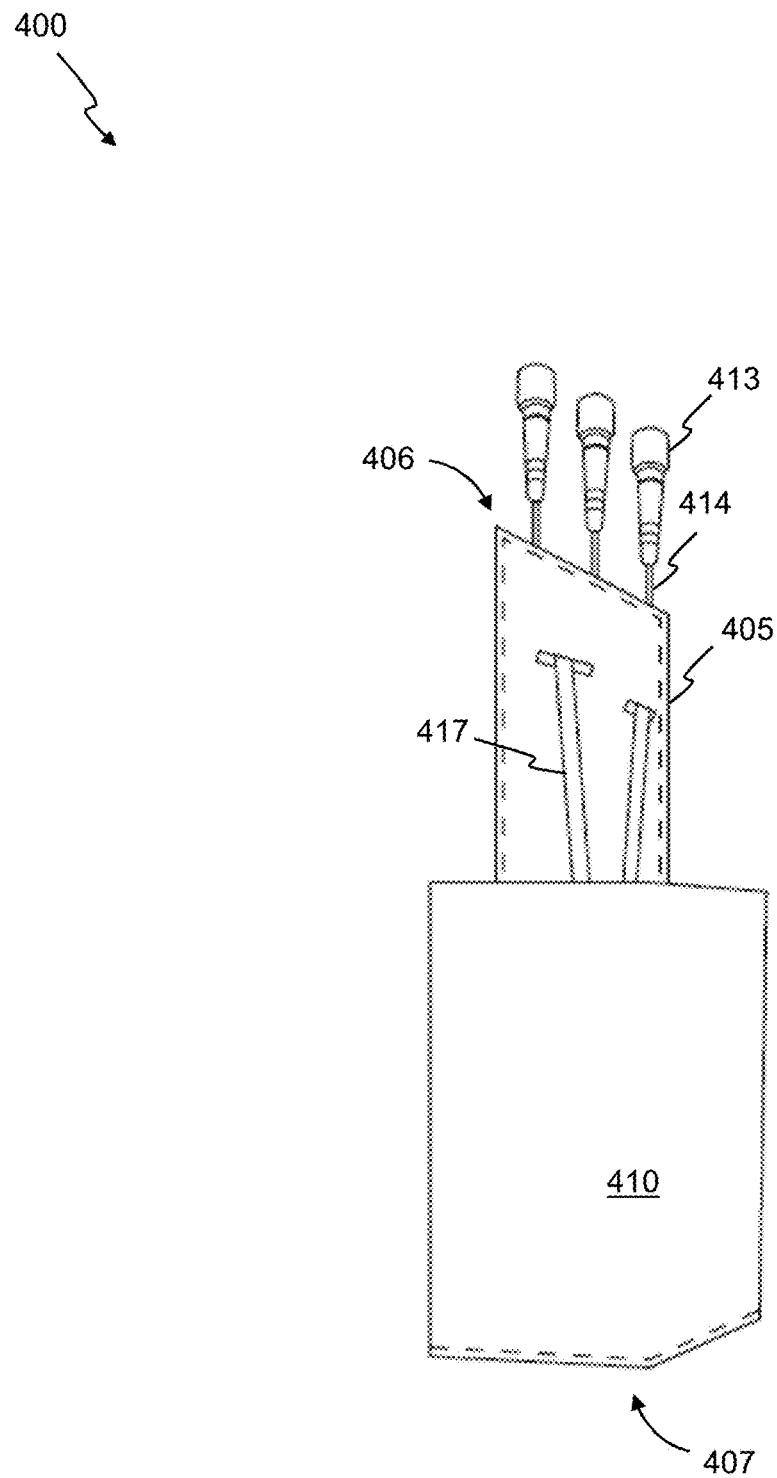
FIG. 6 depicts a perspective view of the PRMS of FIG. 4 in the "closed" state, according to other embodiments.

Turning now to the Figures. To be sure, the terms "open" state and "closed" state refer to an orientation of a portable radio mounting apparatus ("PRMA") to receive and support a portable radio for wireless communication, respectively. FIGS. 1-3 depict a portable radio mounting apparatus ("PRMA"), generally 100, in an "open" state and a "closed" state, according to some embodiments. The PRMA 100 includes a main body 105, a landing pad 110, an antenna element 108, a RF connector 113, a flange 120, and a retaining element 115. The main body 105, the landing pad 110, and the flange 120 are textile-based components (i.e. they are manufactured using textiles). Applicable textiles include, but are not limited to, waterproof textiles, denier, laminated textiles (e.g., laminated canvas and other coated textiles), canvas, Cordura®, nylon, high denier textiles, woven textiles, non-woven textiles, foams, and polymer-based textiles.

In certain embodiments, the applicable textiles exhibit waterproofing characteristics that at least adhere to IEC standard 60529, which is hereby incorporated herein by reference; mechanical protection (i.e. cut, puncture, and abrasion resistance) characteristics that at least adhere to ANSI/ISEA 105 standards, which are hereby incorporated herein by reference; fire/flash/thermal exposure resistance characteristics at least adhering to the standards reflected in NFPA 2112, which are hereby incorporated herein by reference; chemical resistance characteristics that at least adhere to NFPA Standard 1994, which are hereby incorporated herein by reference; and/or reflective/visibility characteristics at least adhering to ANSI/ISEA 107-2015. These mechanical characteristics of the material allows the PRMA of the instant disclosure to perform in challenging environments where exposure to extreme temperatures, fire/flash/thermal exposure, chemical spills, and/or wet/water-logged environments is common.

In general, when in the "open" state, the landing pad 110 is pivoted away from the main body 105 and thereby exposes the retaining element 115; the retaining element 115 receives a portable radio and thereby demountably secures the portable radio to the main body 105; and the RF connector 113 demountably and conductively couples to the portable radio. In the "closed" state, the landing pad 110 is pivoted towards the main body 105 and peripherally extends around at least a portion of the portable radio in a manner to be positioned proximate to the retaining element 115 and the portable radio; and demountably coupled to the main body 105 via a demountable fastener.

The landing pad 110 laterally extends from the main body 105. The main body 105 includes a first end 111 pivotably attached thereto as well as a second end 112 positioned opposite the first end 111. Although the landing pad 110 is depicted as extending lengthwise along the main body 105 (i.e. the two components have similar heights), landing pads, in general, can partially extend lengthwise along the main body (discussed below). Alternatively, the landing pad 110 can extend from a bottom end 107 of the main body 105. Here, the landing pad 110 can be asymmetrically or symmetrically positioned relative to the central axis of the main body 105 (discussed further below). At least one antenna element 108 is affixed to the landing pad 110 and each antenna element 108 is conductively coupled to a RF connector 113 via a cable 114. The antenna element 108 can include a foam or other spacing material positioned thereunder to provide stability to the antenna element 108 as well as to keep the antenna element 108 from sitting directly on the portable radio while in the "closed" state. For example foam or spacing material can have a thickness from ⅛ (one-eighth of an inch) to ½ (half an inch). The RF connector 113 is positioned proximate to the main body 105 and can be a RF connector known in the art that utilize a standard connector type (e.g., SMA, TNC, BNC, etc.). The cable 114 can be a small diameter shielded coaxial cable known in the art (e.g., LMR-100, RG316, etc.) In some aspects, the cable 114 has fire retardant properties (e.g., LMR-100A-FR, FBT-200, UL 1666, and CSA FT4).

Figure 1B:
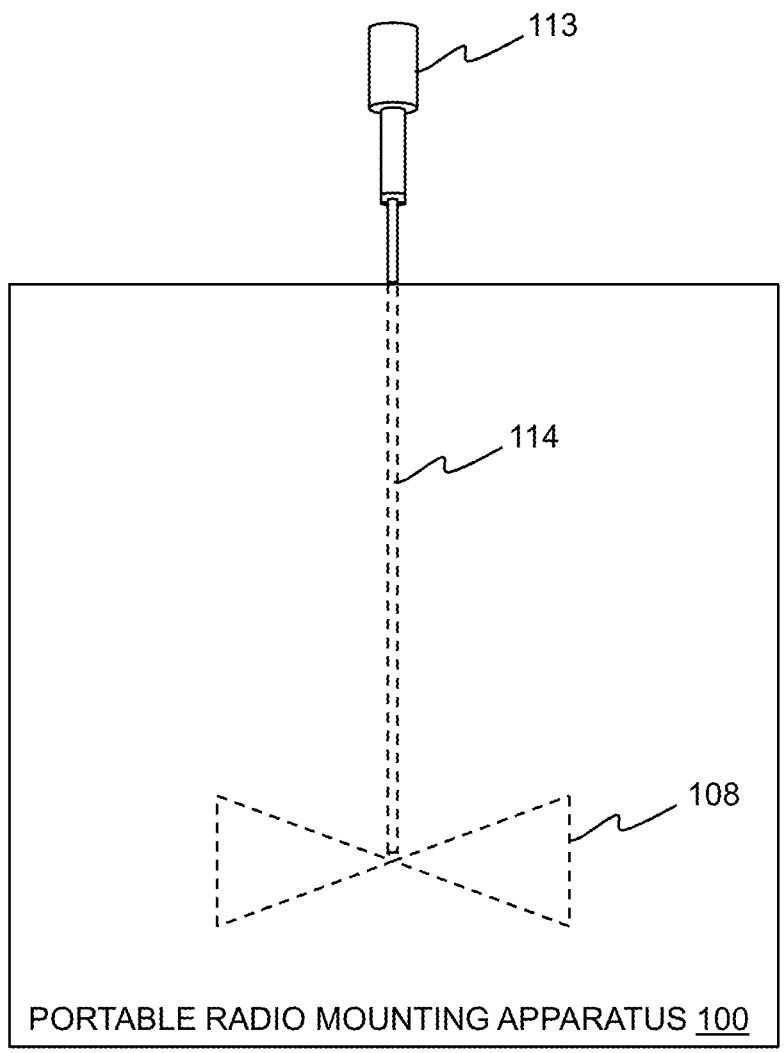
FIG. 1B illustrates a block diagram of a radio frequency ("RF") connector conductively to an embedded antenna element via a partially embedded cable, according to yet still other embodiments.

FIG. 1B illustrates a block diagram of the RF") connector conductively coupled to an embedded antenna element 108 via a partially embedded cable 114, according to yet still other embodiments. The main body 105 can include holes that allow for the cables 114 to come through. Although the cable 114 is depicted as partially embedded within the landing pad 110 to reduce the probability that the component becomes entangled with a foreign object, the cable 114 and/or the antenna element 108 can be externally affixed to the landing pad; however, spacing between the antenna element 108 and any portable radio stored therein should be provided to reduce potential RF interference.

Figure 1C:
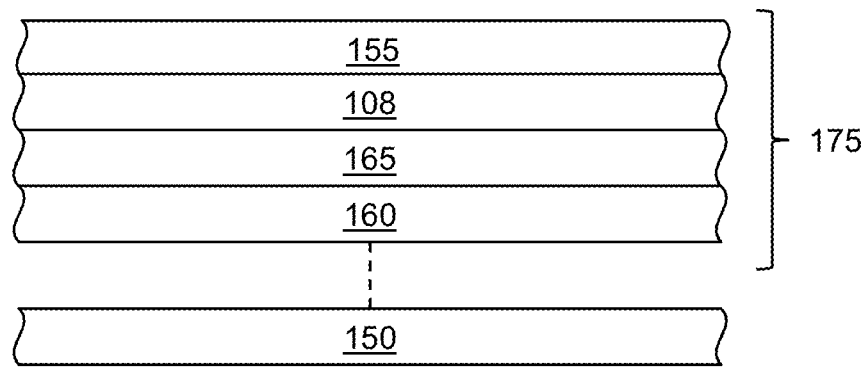
FIG. 1C illustrates a block diagram of a side view of a portable radio positioned proximate to a multilayered structure of a landing pad that includes an antenna element positioned proximate to an EMI shielding layer that are together positioned between a first layer and a second layer, according to some embodiments.

FIG. 1C illustrates a block diagram of a side view of a portable radio 150 positioned proximate to a multilayered structure 175 of the landing pad 110 that includes the antenna element 108 positioned proximate to an EMI shielding layer 165 that are together positioned between a first layer 155 and a second layer 160, according to some embodiments. The first layer 155 and the second layer 160 form the external layers of the multilayered structure 175 with the antenna element 108 positioned proximate to the first layer 155. The antenna element 108 is positioned within the multilayered structure 175. Although not shown, the multilayered structure 175 can include additional layers and/or components than depicted. The first layer 155 and the second layer 160 are the external layers of the multilayered structure 175.

In the "closed" state (discussed below), the EMI shielding layer 165 is positioned between the antenna element 108 and the portable radio 150 (and hence, the user) to reflect, block, absorb, shield at least a portion of the RF radiation that emanates from the antenna element 108. The EMI shielding layer 165 can be any textile known in the art that reflects, blocks, absorbs, and/or shields EM radiation (e.g., RF radiation). For example, applicable EMI shielding textiles and materials include, but are not limited to, polypropylene foams to provide shielding as well as separation of the antenna element 108 from the portable radio 150 to reduce RF interference and reduce the user's specific absorption rate (SAR). Applicable EMI shielding textiles include woven, nonwoven, natural, and synthetic textile that are coated, lined, and/or contain conductive material, such as a metal, aluminum foil, copper foil, graphene, silver, copper conductive ink, graphite, carbon nanotubes, and similar conductive materials.

Figure 1D:
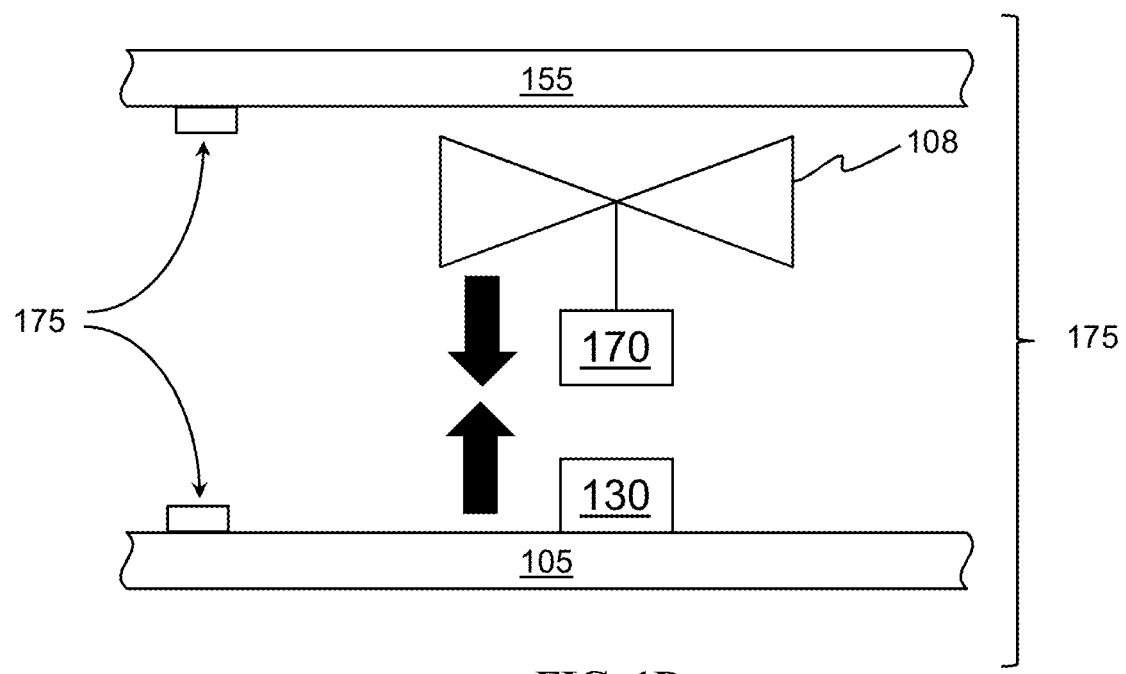
FIG. 1D illustrates a block diagram of a side view of the multilayered structure of FIG. 1C that internally includes demountable fasteners, an antenna element, a pairing element and an antenna attachment site, according to other embodiments.

In certain aspects, the PRMA 100 includes antenna elements 108b that are antenna elements that are replaceable with other copies of the antenna element 108b that operate on a different frequency. In other words, the PRMA 100 can exchange antenna elements of different frequencies. FIG. 1D illustrates a block diagram of a side view of the multilayered structure 175 that includes an internally positioned demountable fastener 176, an antenna element 108b, a pairing element 170, and an antenna attachment site 130, according to other embodiments. Here, the antenna attachment site 130 is positioned within the multilayered structure 175 (e.g., on the internal surface of the second layer 160). The demountable fastener 176 demountably couples the first layer 155 to the second layer 160. The demountable fastener 176 can be a hook and loop fastener, snap connector, zipper, other multicomponent demountable fastener known in the art that can facilitate one or more embodiments of the instant disclosure. To be sure, the antenna element 108b includes similar components and materials as well as can be manufactured in a similar manner as the antenna element 108.

To open the multilayered structure 175, the demountable fastener 176 must first be oriented and/or positioned as required to disengage from itself. Similarly, to close or seal the multilayered structure 175, the demountable fastener 176 must be oriented and/or positioned as required to engage itself. To attach the pairing element 170 to the antenna attachment site 130 the pairing element 170 and the antenna attachment site 130 demountably engage each other when shifted in a common plane, which thereby forms a selective, intermitting, and conductive coupling therebetween. When coupled together, the antenna attachment site 130 and the pairing element 170 facilitate RF wave propagation between the portable radio and the antenna element 108. To remove the antenna element 108b the pairing element 170 and the antenna attachment site 130 are removed from the common plane, which thereby breaks the selective, intermitting, and conductive coupling therebetween.

The fungibility of the antenna elements 108 allows PRMA 100 to generate or alter RF frequency coverage and RF radiation patterns thereof to meet individual needs, inclinations, and/or specifications. In addition, the quantity of the antenna elements 108 included in the PRMA 100 can be varied depending on the portable radio type and user-defined requirements.

The flange 120 is pivotably coupled to and laterally extends from the main body 105 opposite to the landing pad 110. PRMA 100 also includes a second flange 130 pivotably coupled to and extending from the main body 105. The second flange 103 is positioned orthogonal to both the flange 120 and the landing pad 110. Alternatively, the second flange 130 can extend from the main body 105 orthogonal to at least one of the flange 120 and the landing pad 110. The PRMA 100 can include any quantity (e.g., at least one) of the flange 120 and the second flange 130 to facilitate one or more embodiments of the instant disclosure. The flange 120 includes and the second flange 130 each include a copy of a first mating component 132 affixed thereto that mates with a copy of a second mating component 140 complementarily positioned on the landing pad 110. For example, in the "open" state, the first mating component 132 and a second mating component 140 are positioned on opposite surface of the PRMA 100; and the first mating component 132 is uncoupled from the second mating component 140.

In other words, in the "open" state, the first mating component 132 and the second mating component 140 are oriented opposite each other and have complementary positioning to facilitate their mating together in the "closed" state). The second mating component 140 is peripherally positioned on the landing pad 110 proximate to the second end 112. Although the mating component 122 is depicted as affixed to the flange 120, the component can also be positioned on the main body 105 in embodiments that do not include the flange 120.

In the "closed" state, the first mating components (e.g., the first mating component 122 and the first mating component 132) demountably engages (i.e. mates with) the second mating components 140 to thereby form a demountable fastener (e.g., a hook and loop fastener, snap connector, zipper, other multicomponent demountable fastener known in the art to demountably couple textile components together) that demountably couples one or more of the flange 120 and the second flange 130 to the landing pad 110. In other words, one or more of the flange 120 and the second flange 130 demountably couples to the landing pad 110 via the demountable fastener that is formed when one or more of the first mating component 122 and the first mating component 132 demountably engages (i.e. mates with) the second mating components 140. For example, the mating component 122 and the mating component 140 can be formed using a metal(s), an alloy(s), a polymer(s), or a combination of two or more thereof. The mating component 122 and the mating component 140 together form a demountable fastener.

The second flange 130, similar to the flange 120, includes a first mating component 122 and the landing pad 110 includes second mating component 140 that demountably mates with a complimentary positioned copy of the second mating component 140 of the landing pad. When the second flange 130 is present, in the "open" state (e.g., see FIG. 1A), the landing pad 110 is pivoted away from one or more of the flange 120 and the second flange 130.

Retaining elements of the instant disclosure are utilized to stabilize and secure the portable radio to the main body 105. The main body 105 includes a second retaining element 117 positioned thereon and proximate to the retaining element 115. The second retaining element 117 is oriented orthogonal to the retaining element 115 and together secure a portable radio to the surface of the main body. The retaining element 115 and the second retaining element 117 are each demountable fasteners that include one or more of a buckle, a strap, a latch, and an elastic cord. The retaining element 115 and the second retaining element 117 are each flexibly coupled to the main body 105 to allow the components to receive and secure the portable radio to the main body 105. In the "open" state, the landing pad 110 is pivoted away from the second retaining element 117, which is now exposed, and thereby allows the component to receive the portable radio and thereby secure the portable radio to the main body 110. In the "closed" state, the landing pad 110 is positioned proximate to and at least partially extends around the second retaining element 117 (and, in other embodiments, the retaining element 115.

FIG. 3 depicts a rear view of the PRMS 100 in the "closed" state of FIG. 1, according to certain embodiments. A rear surface 315 of the main body 105 can include one or more load-bearing attachment elements to mount the PRMA 100 on objects and/or apparel items that have complementary structures (e.g., backpacks, tactical vests, ballistic plate carriers, and similar items). For example, the rear surface 315 is depicted with a plurality of vertical straps 310 and horizontal straps 305 sewn together with spacing between the individual components (e.g., 1"-1.5"). There is a vertical stitch line down the middle of the each of the horizontal straps 305 to connect the components to the rear surface 315. The alternatively, the vertical straps 310 and horizontal straps 305 can be bonded and/or stapled to the rear surface 315. The vertical straps 310 and horizontal straps 305 can be woven together. The vertical straps 310 and the horizontal straps 305 can be replaced with Velcro, a hook(s), a clasp(s), or similar demountable fasteners; however, the weight of the portable radio as well as the operational requirements of the user (e.g., walking, running, erratic movements, adventure sports, etc.) and operational environment of the portable radio (e.g., recreational, commercial, military, disaster response, etc.) of the PRMA 100 should be taken in to consideration when determining a suitable load-bearing attachment element.

The antenna element 108 is a conductive object that transmits and receives radio waves. The antenna element 108 are preferably planar, flexible, and bendable electrically conductive structures that have a reduced visual signature (e.g., less than 2 mm thick). The antenna element 108 is formed (e.g., screen printing, coating, painting, similar application methods) using a conductive composition that includes a polymer(s) and fully exfoliated single sheets of graphene. Alternatively, the antenna element 108 can be formed via painting, casting, molding, additive deposition, and similar manufacturing processes. The antenna elements 108 preferably exhibit a gain greater than 0 dB (e.g., 1-5 dBi). When the landing pad 110 includes more than one copy of the antenna elements 108, adjacent antenna elements 108 are positioned at least ½ wavelength apart to reduce RF interference between them. Not to be restricted by theory, when antenna elements 108 are positioned closer than ½ wavelength it causes movement of electrons in neighboring antenna elements. Here, the RF signal is not inducing electron movement, but rather such movement would be influenced by the other (i.e. adjacent) antenna element 108. The electron movement caused by the neighboring antenna element is termed "interference." As used herein, the term "null area" refers to a distance of up to a half wavelength from the antenna element and the gain is less than −3 dBi in any particular direction.

The fully exfoliated single sheets of graphene are blended with the polymer(s) to form a three-dimensional percolated network within the polymer(s) where the fully exfoliated single sheets of graphene are separated on a nanoscale within the polymer(s), which yields superior conductivity for the composition compared to un-percolated compositions that may rely more on the conductivity of the polymer. In preferred embodiments, a fully exfoliated single sheet of graphene is about 1 nm thick and substantially planar.

Alternatively, the antenna elements 108 could also be printed using other polymer-based conductive inks that contain metals that include, but are not limited to, silver, copper, carbon, nickel, or a combination thereof. Increase in resistance results in a decrease in the antenna element 108 performance efficiency. As used herein, "antenna efficiency" is defined as the ratio of power delivered to antenna element versus the power radiated therefrom. Here, an increase in electrical resistance decreases the amount of power available for radiation, which thereby decreases antenna element performance efficiency. Antenna elements are preferably screen printed using graphene and conductive polymer-based inks on 5 mil thick PET sheets.

In certain embodiments, the antenna element 108 includes an antenna array. For example, use of such antenna arrays could provide a statistical increase in gain, directionality, and circular polarization. Such antenna arrays include a variety of antenna types, including, but not limited to, dipole antennas, patch antennas or other planar antenna element designs suitable for use in antenna arrays. Such antenna arrays are preferably configured to include a single connection conductively coupled to transmission line such that power input from transmission line to the antenna array is split to the antenna elements of the array. Alternatively, such antenna arrays may be configured to include multiple connections conductively coupled to multiple transmission lines.

In certain embodiments, the fully exfoliated single sheets of graphene have surface imperfection (i.e. "wrinkles" or "kinks") resulting from the presence of lattice defects in, or by chemical functionalization of the two-dimensional hexagonal lattice structure of the basal plane. Applicable polymers include, but are not limited to, polyethylene terephthalate, acrylic, rayon, aramid, modacrylic, spandex, nylon, olefin, polyester, saran, sulfur, polypropylene, polyethylene, elastane, and similar polymers. The fully exfoliated graphene sheets (i.e. the graphene sheets) as well as the conductive composition are ideally generated as disclosed in U.S. Pat. No. 7,658,901 B2 by Prud'Homme et al; U.S. Pat. No. 8,278,757 B2 by Crain; US Patent Pub. No. 2011/0189452 A1 by Lettow et al.; and US Patent Pub. No. 2014/0050903 A1 by Lettow et al., which are each hereby incorporated herein by reference in their entirety. The fully exfoliated graphene sheets preferably have a surface area of about 2,630 m$^2$/g to promote a low percolation threshold of, for example, 0.52 vol. %.

To be sure, neither carbon nanotubes (e.g., SWCNT or MWCNT) nor graphite are substitutions of the aforementioned fully exfoliated graphene sheets due the different inherit structural, electrical, and mechanical properties of the materials. For example, the fully exfoliated graphene sheets have a platy (e.g., two-dimensional) structure as opposed to the three-dimensional structure of carbon nanotubes and graphite.

Figure 7:
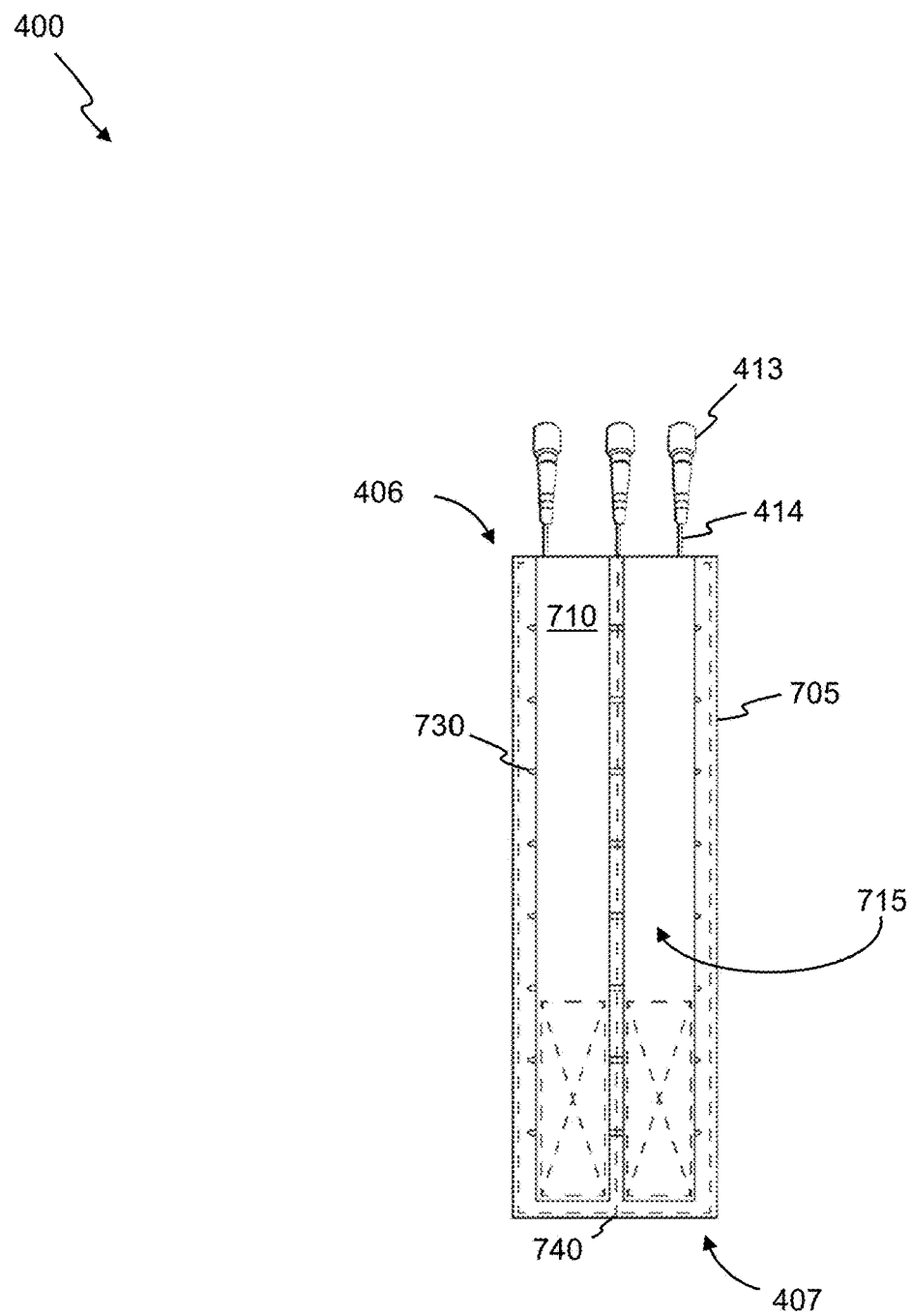
FIG. 7 depicts a rear view of the PRMS of FIG. 4 in the "closed" state, according to certain embodiments.
Figure 8:
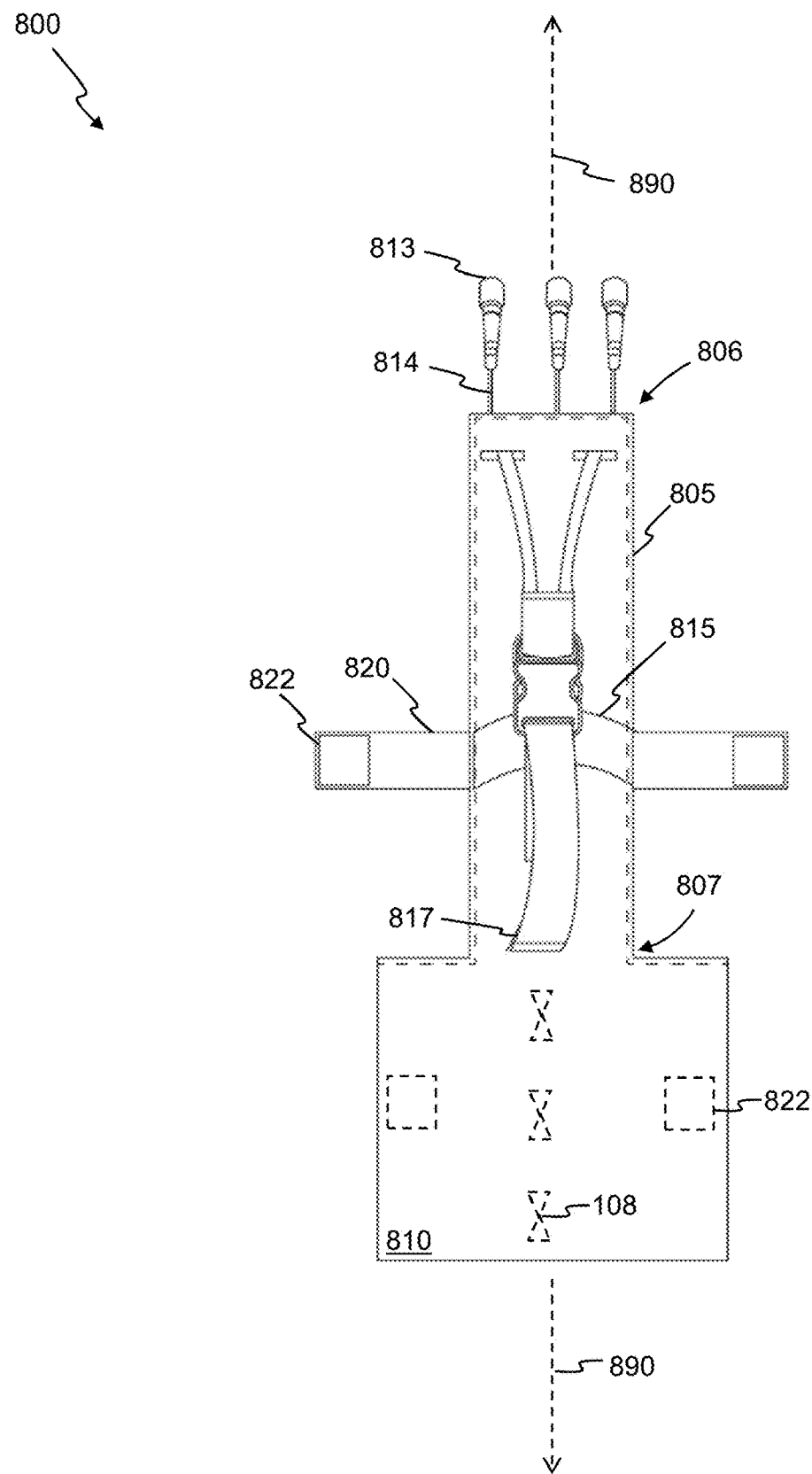
FIG. 8 depicts a front view of a portable radio mounting solution ("PRMS") in an "open" state, according to yet still other embodiments.
Figure 9:
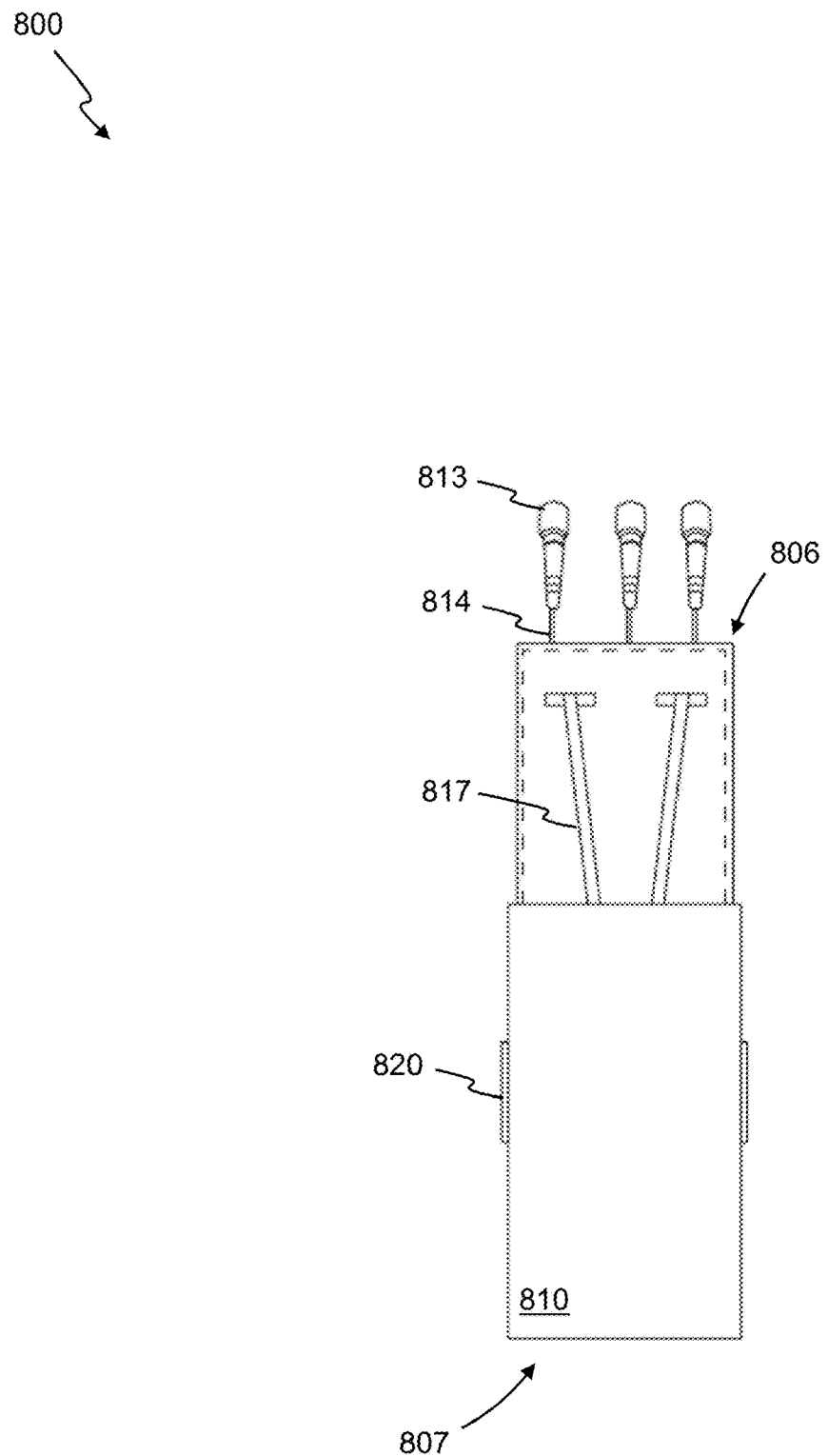
FIG. 9 depicts a front view of the PRMS of FIG. 8 in a "closed" state, according to some embodiments.
Figure 10:
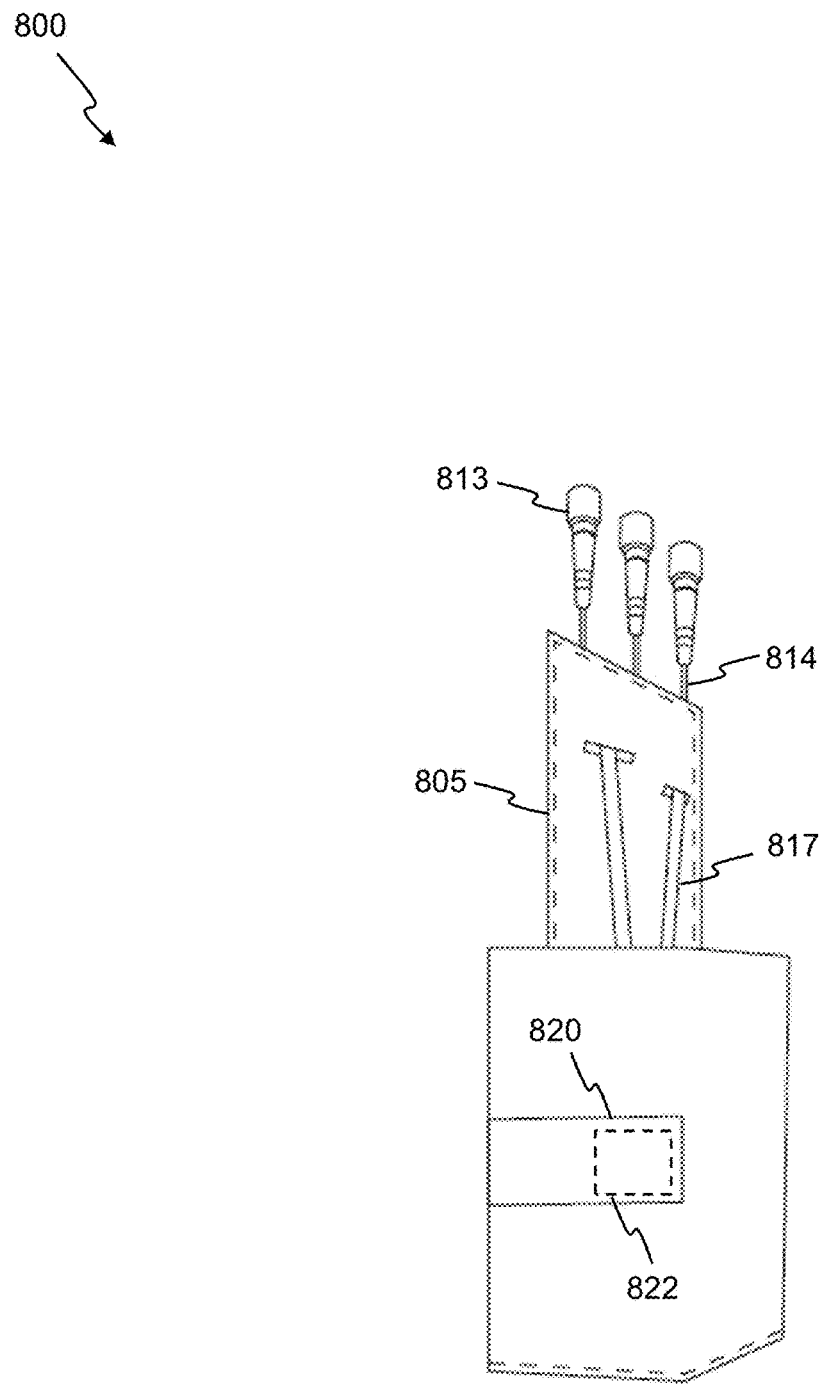
FIG. 10 depicts a perspective view of the PRMS of FIG. 8 in the "closed" state, according to other embodiments.
Figure 11:
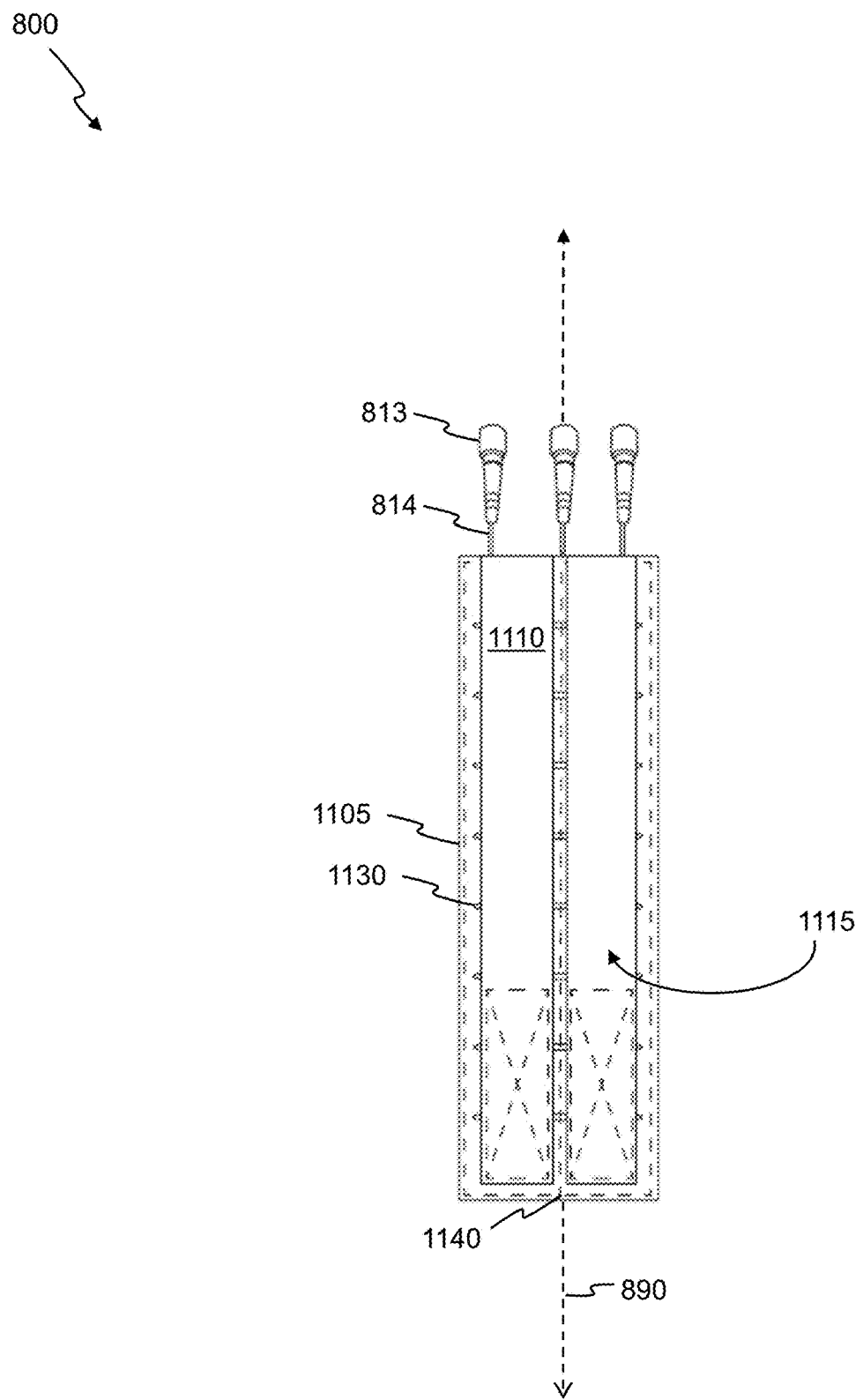
FIG. 11 depicts a rear view of the PRMS of FIG. 8 in the "closed" state, according to certain embodiments.

Turning now to FIGS. 4-7, which depicts various views of a PRMA 400 in an "open" state and a "closed" state, according to some embodiments. To be sure, the PRMA 400 includes similar elements, components, connections, and materials as the PRMA 100. Here, unless otherwise stated, the first digit of the three-digit reference numerals used to designate elements of the PRMA 100 (i.e. 1##) is herein supplemented with a "4" to refer to the complementary elements of the PRMA 400. The PRMA 400 includes a main body 405, a landing pad 410, an antenna element 108, a RF connector 413 conductively coupled to the antenna element 108, as well as a flange 420 and a retaining element 415 that extend laterally from opposing sides of the main body 405. The flange 420 and the landing pad 410 extend laterally from opposing sides of the main body 405. Although the landing pad 410 has a width that is greater than the flange 420, the two components share the same height (which is less than that of the main body). As shown in FIG. 7, the rear surface 415 includes a panel 705, which replaces the horizontal straps 305. The panel 705 includes horizontal slits 730 positioned therein and is affixed (e.g., via sewing, polymeric bonding, staples, or a combination of two or more thereof) to the rear surface 715 with a vertical stitch or demarcation line 740. Vertical straps 710 are positioned on each side of the vertical stitch and affixed to the panel 705 to thereby form a webbing structure.

Turning now to FIGS. 8-11, which depict various views of a PRMA 800 in an "open" state and a "closed" state, according to some embodiments. To be sure, the PRMA 800 includes similar elements, components, connections, and materials that have similar functions and characteristics as those of the PRMA 100. Here, unless otherwise stated, the first digit of the three-digit reference numerals used to designate elements of the PRMA 100 (i.e. 1##) is herein supplemented with an "8" to refer to the complementary elements of the PRMA 800.

The PRMA 800 includes a main body 805, a landing pad 810, antenna elements 108, a RF connector 813 conductively coupled to each antenna element 108 (see FIG. 1B), retaining elements 815 as well as flanges 820. Each copy of the flanges 820 laterally extends from opposing sides of the main body 805. The landing pad 810 extends from a bottom end 807 of the PRMA 800, which is positioned opposite the top end 806. The landing pad 810 is symmetrically positioned relative to the central axis 890 of the main body 805. In the "open" state depicted in FIG. 8, the landing pad 810 has a width that is greater than that of the main body 805. The rear surface 1115 includes a panel 1105, which replaces the horizontal straps 305, that has horizontal slits 1130 positioned therein and is affixed (e.g., via sewing, polymeric bonding, staples, or a combination of two or more thereof) to the rear surface 1115 with a vertical stitch or demarcation line 1140. Vertical straps 1110 are positioned on each side of the vertical stitch and affixed to the panel 1105 to thereby form a webbing structure.

FIGS. 12-15 depict various steps of a process to convert a PRMS 1200 from an "open" state to a "closed" state, according certain embodiments. The PRMA 1200 includes similar elements, components, and materials that have similar functions, connections, and characteristics as those of the PRMA 100. Here, unless otherwise stated, the first digit of the three-digit reference numerals used to designate elements of the PRMA 100 (i.e. 1##) is herein supplemented with an "8" to refer to the complementary elements of the PRMA 800.

The PRMA 1200 includes a main body 1205, a landing pad 1210, a plurality of antenna elements 108 each conductively coupled to a RF connector 813, and a retaining element 1215. The landing pad 1210 extends from a bottom end 1207. The landing pad 1210 extends lengthwise to be longer than the PRMA 1200 will receive (e.g., portable radio 1260). The landing pad 1210 is symmetrically positioned relative to the central axis 1290 of the main body 1205. The landing pad 1210 also includes a retaining element 1270 affixed thereto and positioned opposite to the bottom end 1207. Here, the retaining element 1270 is depicted as flexible cord pivotably affixed at each end to the landing pad 1210. In the "open" state, the landing pad 810 has a width that is greater than the main body 1205.

Figure 12:
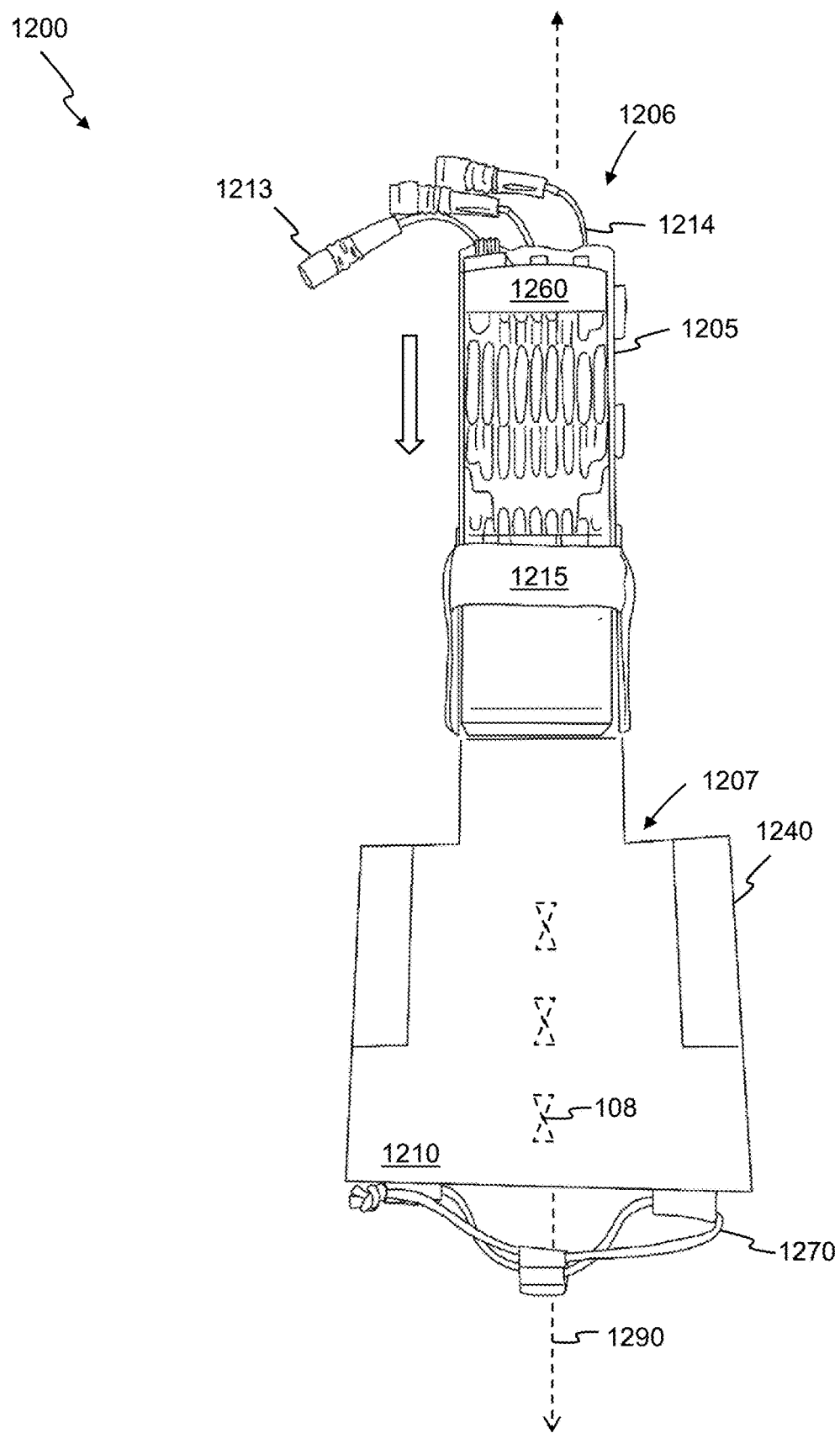
FIG. 12 depicts a step of a process to convert a PRMS from an "open" state to a "closed" state, according to yet still other embodiments.
Figure 13:
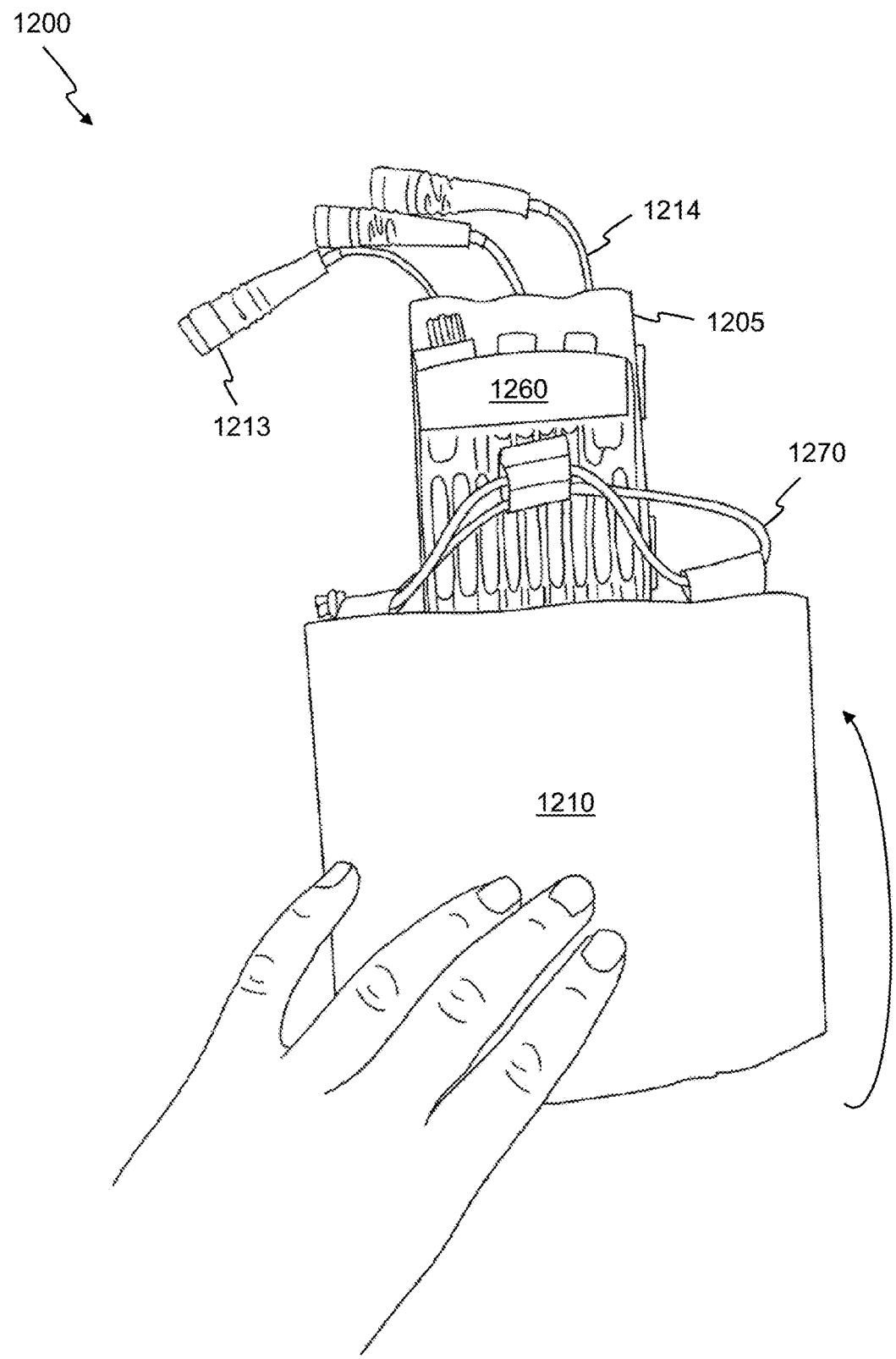
FIG. 13 depicts an additional step of the process of FIG. 12, according to some embodiments.
Figure 14:
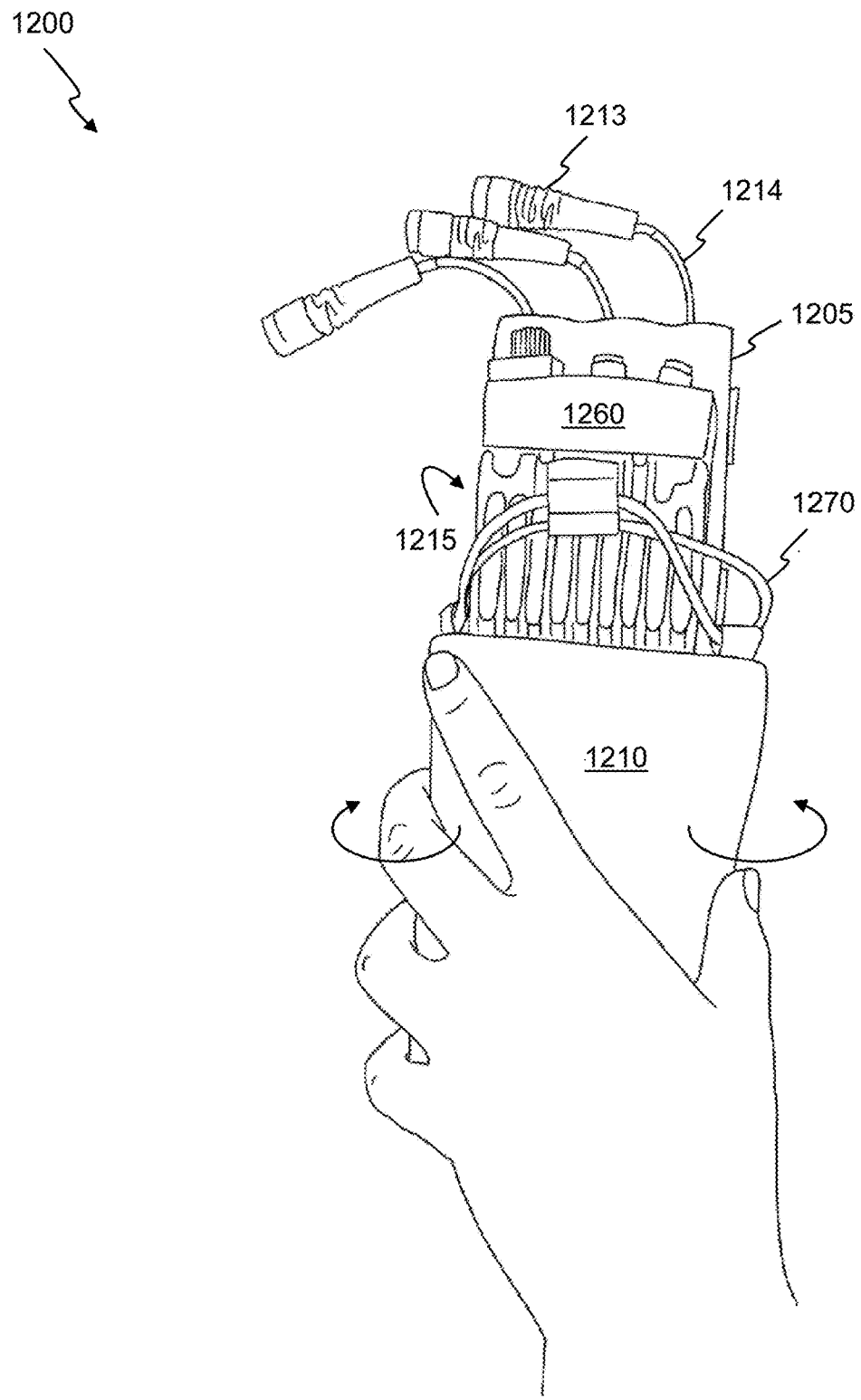
FIG. 14 depicts another step of the process of FIG. 12, according to other embodiments.
Figure 15:
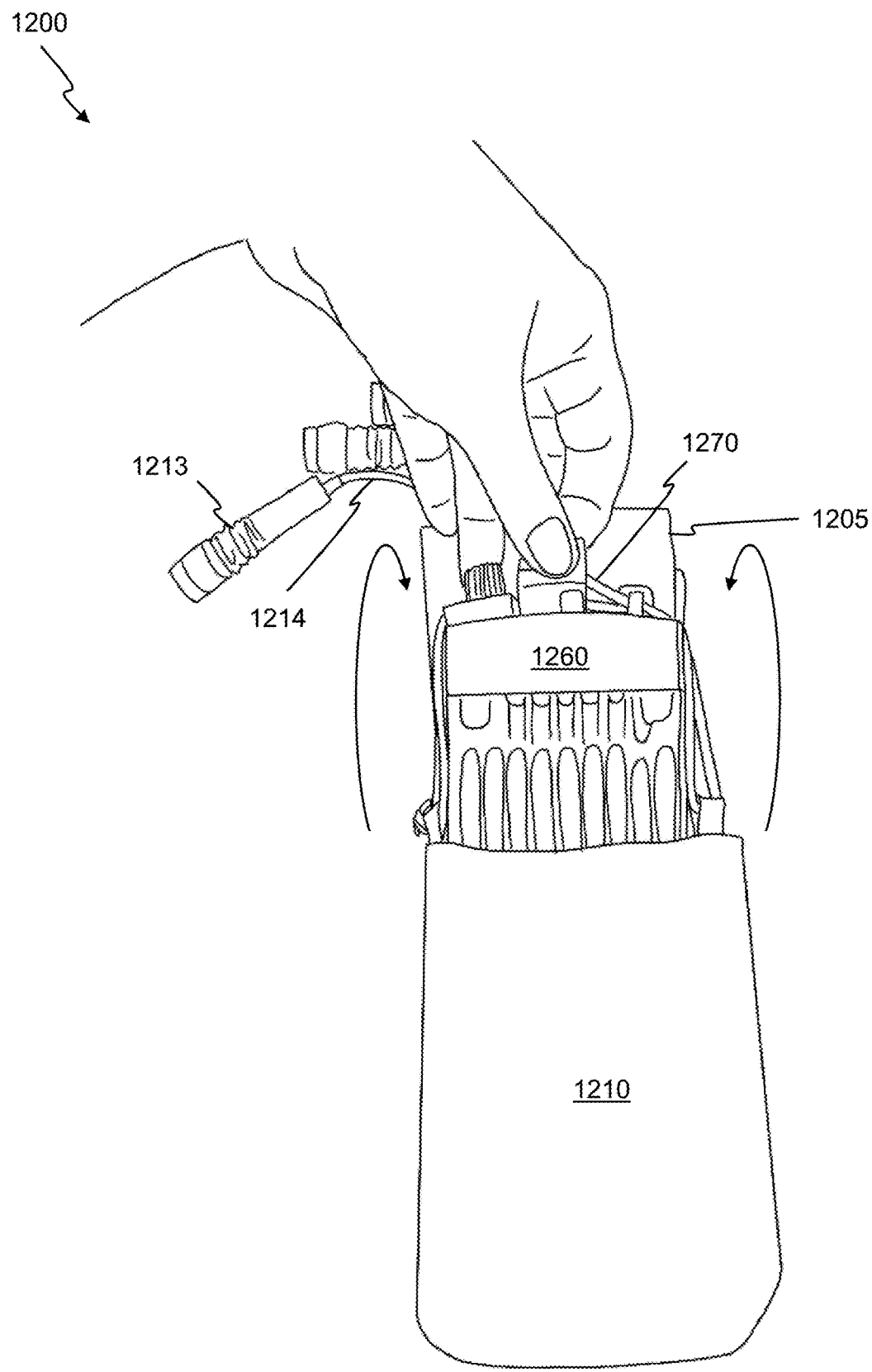
FIG. 15 depicts a certain step of the process of FIG. 12, according to certain embodiments.
Figure 16:
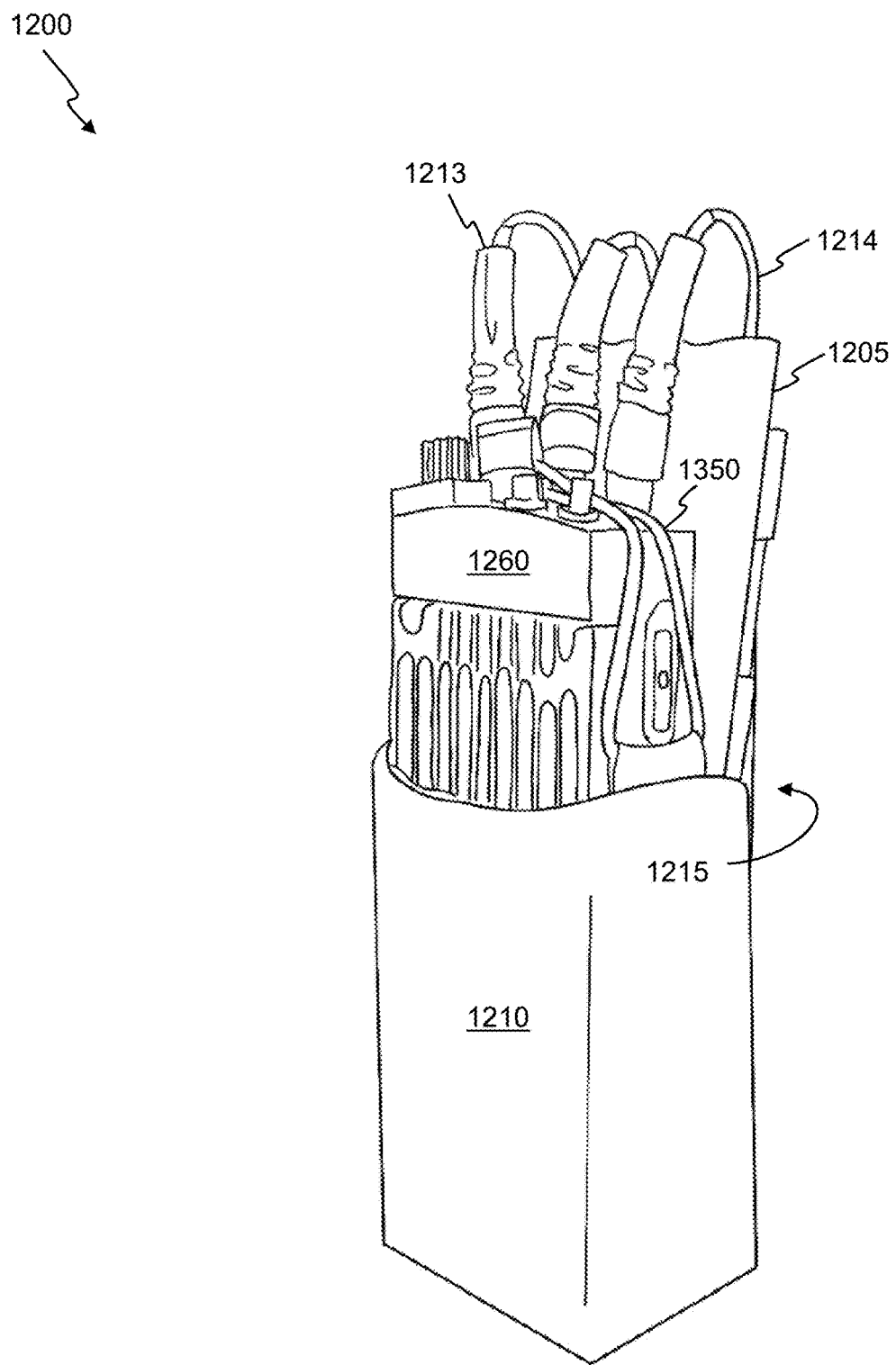
FIG. 16 depicts a final product of the process of FIG. 12, according to yet still other embodiments.

To begin, in FIG. 12, the retaining element 1215 receives the portable radio 1260 in the "open" state. Next, as depicted in FIG. 13, the landing pad 1210 is pivoted towards the main body 1205 and positioned proximate to the retaining element 1215 and the portable radio 1260. Subsequently, as depicted in FIG. 14, the main body 1210 is wrapped around the retaining element 1215 and the portable radio 1260 towards a rear surface 1215 of the PRMA 1200 to allow the peripherally positioned second mating component 1240 to engage (i.e. mate with) first mating components 1222 (not shown) positioned on a rear surface 1215. In FIG. 15, the retaining element 1270 is pulled taut around the top of the portable radio 1260 to further secure the portable radio 1260 to the main body 1205 and thereby complete the conversion to the "closed" state. The portable radio 1260 is now ready to wirelessly communicate via the PRMA 1200. FIG. 16 depicts the final product of the conversion process of FIGS. 12-15, according to yet still other embodiments.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Based on the foregoing, computer system, method and program product have been disclosed in accordance with the present invention. However, numerous modifications and substitutions can be made without deviating from the scope of the present invention. Therefore, the present invention has been disclosed by way of example and not limitation. As various modifications could be made in the constructions and methods herein described and illustrated without departing from the scope of the invention, it is intended that all matter contained in the foregoing description or shown in the accompanying drawings shall be interpreted as illustrative rather than limiting. Thus the breadth and scope of the present invention should not be limited by any of the above-described exemplary embodiments, but should be defined only in accordance with the following claims appended hereto and their equivalents.

What is claimed is:

1. A portable radio mounting apparatus, comprising:
a main body;
a landing pad;
an antenna element;
a RF connector conductively coupled to the antenna element;
a retaining element;
an open state;
a closed state;
wherein
the landing pad
laterally extends from the main body;
comprises a first end that is pivotably coupled to main body;
the retaining element is flexibly coupled to the main body;
the antenna element is affixed to the landing pad;
the RF connector
is conductively coupled to the antenna element;
is positioned proximate to the main body;
in the open state
the landing pad is pivoted away from the main body and thereby exposes the retaining element;
the retaining element receives a portable radio and thereby demountably secures the portable radio to the main body;
the RF connector demountably and conductively couples to the portable radio;
in the close state
the landing pad
is pivoted towards the main body and peripherally extends around at least a portion of the portable radio in a manner to be positioned proximate to the retaining element and the portable radio; and
is demountably coupled to the main body.

2. The portable radio mounting apparatus of claim 1, wherein
the antenna element comprises a conductive composition;
the conductive composition comprises:
fully exfoliated single sheets of graphene;
a polymer; and
the fully exfoliated single sheets of graphene are present as a three-dimensional percolated network within the polymer.

3. The portable radio mounting apparatus of claim 1, wherein
the retaining element comprises one or more of a buckle, a strap, a latch, and an elastic cord.

4. The portable radio mounting apparatus of claim 1, wherein
the main body comprises a second retaining element;
the second retaining element
positioned proximate to the retaining element;
oriented orthogonal to the retaining element;
is a demountable fastener that comprises one or more of a buckle, a strap, a latch, and an elastic cord;
in the open state
the landing pad is pivoted away from the second retaining element;
the second retaining element
is exposed;
receives the portable radio and thereby secures the portable radio to the main body; and
in the closed state, the landing pad is positioned proximate to and at least partially extends around the second retaining element.

5. The portable radio mounting apparatus of claim 1, wherein
the main body comprises one or more of a flange and a second flange;
the flange is pivotably coupled to and laterally extends from the main body opposite to the landing pad;
the second flange is pivotably coupled to and extends from the main body orthogonal to one or more of the flange and the landing pad;
in the open state, the landing pad is pivoted away from one or more of the flange and the second flange; and
in the closed state, one or more of the flange and the second flange demountably couples to the landing pad via a demountable fastener.

6. The portable radio mounting apparatus of claim 5, wherein
one or more of the flange and the second flange comprises a first mating component;
the landing pad comprises
a second mating component;
a second end positioned opposite the first end;
the second mating component is peripherally positioned thereon proximate to the second end;
in the open state
the first mating component and second mating component are oriented opposite each other;
the first mating component is uncoupled from the second mating component; and
in the closed state, the first mating component mates with the second mating component and thereby forms the demountable fastener that demountably couples one or more of the flange and the second flange to the landing pad.

7. The portable radio mounting apparatus of claim 1, wherein
the landing pad extends lengthwise along the main body.

8. The portable radio mounting apparatus of claim 1, wherein
the landing pad
extends from a bottom end of the main body; and
is symmetrically positioned relative to a central axis of the main body.

9. The portable radio mounting apparatus of claim 1, wherein
the antenna element comprises a pairing element;
the landing pad comprises:
an antenna attachment site;
a first layer;
a second layer positioned opposite the first layer to form a multilayered structure;
a demountable fastener;
the antenna attachment site is positioned within the multilayered structure
the pairing element and the antenna attachment site demountably engage each other when shifted in a common plane, which thereby forms a selective, intermitting, and conductive coupling therebetween; and
the demountable fastener demountably couples the first layer to the second layer.

10. The portable radio mounting apparatus of claim 1, wherein
the landing pad comprises:
a first layer;
a second layer positioned opposite the first layer to form a multilayered structure;
an EMI shielding layer;
the antenna element is positioned within the multilayered structure;
the EMI shielding is positioned within the multilayered structure proximate to the antenna element; and
in the closed state, the EMI shielding layer is positioned between the antenna element and the portable radio.

11. A portable radio mounting apparatus, comprising:
a main body;
a landing pad;
an antenna element;
a RF connector conductively coupled to the antenna element;
a retaining element;
an open state;
a closed state;
wherein
the landing pad
laterally extends from the main body;
comprises a first end that is pivotably coupled to main body;
the retaining element is flexibly coupled to the main body;
the antenna element
is affixed to the landing pad;
comprises a conductive composition;
the conductive composition comprises:
fully exfoliated single sheets of graphene;
a polymer;
the fully exfoliated single sheets of graphene are present as a three-dimensional percolated network within the polymer;
the RF connector
is conductively coupled to the antenna element;
is positioned proximate to the main body;
in the open state
the landing pad is pivoted away from the main body and thereby exposes the retaining element;
the retaining element receives a portable radio and thereby demountably secures the portable radio to the main body;
the RF connector demountably and conductively couples to the portable radio;
in the close state
the landing pad
is pivoted towards the main body and peripherally extends around at least a portion of the portable radio in a manner to be positioned proximate to the retaining element and the portable radio; and
is demountably coupled to the main body.

12. The portable radio mounting apparatus of claim 11, wherein
the retaining element comprises one or more of a buckle, a strap, a latch, and an elastic cord.

13. The portable radio mounting apparatus of claim 11, wherein
the main body comprises a second retaining element;
the second retaining element
positioned proximate to the retaining element;
oriented orthogonal to the retaining element;
is a demountable fastener that comprises one or more of a buckle, a strap, a latch, and an elastic cord;
in the open state
the landing pad is pivoted away from the second retaining element;
the second retaining element
is exposed;
receives the portable radio and thereby secures the portable radio to the main body; and
in the closed state, the landing pad is positioned proximate to and at least partially extends around the second retaining element.

14. The portable radio mounting apparatus of claim 11, wherein
the main body comprises one or more of a flange and a second flange;
the flange is pivotably coupled to and laterally extends from the main body opposite to the landing pad;
the second flange is pivotably coupled to and extends from the main body orthogonal to one or more of the flange and the landing pad;
in the open state, the landing pad is pivoted away from one or more of the flange and the second flange; and
in the closed state, one or more of the flange and the second flange demountably couples to the landing pad via a demountable fastener.

15. The portable radio mounting apparatus of claim 14, wherein
one or more of the flange and the second flange comprises
a first mating component;
the landing pad comprises
a second mating component;
a second end positioned opposite the first end;
the second mating component is peripherally positioned thereon proximate to the second end;
in the open state
the first mating component and second mating component are oriented opposite each other;
the first mating component is uncoupled from the second mating component; and
in the closed state, the first mating component mates with the second mating component and thereby forms the demountable fastener that demountably couples one or more of the flange and the second flange to the landing pad.

16. The portable radio mounting apparatus of claim 11, wherein
the landing pad extends lengthwise along the main body.

17. The portable radio mounting apparatus of claim 11, wherein
the landing pad
extends from a bottom end of the main body; and
is symmetrically positioned relative to a central axis of the main body.

18. The portable radio mounting apparatus of claim 11, wherein
the antenna element comprises a pairing element;
the landing pad comprises:
an antenna attachment site;
a first layer;
a second layer positioned opposite the first layer to form a multilayered structure;
a demountable fastener;
the antenna attachment site is positioned within the multilayered structure
the pairing element and the antenna attachment site demountably engage each other when shifted in a common plane, which thereby forms a selective, intermitting, and conductive coupling therebetween; and
the demountable fastener demountably couples the first layer to the second layer.

* * * * *